(12) United States Patent
Hida

(10) Patent No.: US 9,243,737 B2
(45) Date of Patent: Jan. 26, 2016

(54) TRIPOD APPARATUS

(71) Applicant: HEIWA SEIKI KOGYO CO., LTD., Saitama (JP)

(72) Inventor: Nobuyuki Hida, Saitama (JP)

(73) Assignee: HEIWA SEIKI KOGYO CO., LTD., Saitama (JP)

( * ) Notice: Subject to any disclaimer, the term of this patent is extended or adjusted under 35 U.S.C. 154(b) by 27 days.

(21) Appl. No.: 14/328,134

(22) Filed: Jul. 10, 2014

(65) Prior Publication Data

US 2015/0233521 A1    Aug. 20, 2015

(30) Foreign Application Priority Data

Feb. 20, 2014   (JP) .................................. 2014-030346

(51) Int. Cl.
*F16M 11/04*   (2006.01)
*F16M 11/24*   (2006.01)

(52) U.S. Cl.
CPC ............. *F16M 11/045* (2013.01); *F16M 11/04* (2013.01); *F16M 11/242* (2013.01)

(58) Field of Classification Search
CPC .................................................. F16M 11/045
USPC ................ 248/676, 678, 125.8, 125.9, 176.1, 248/177.1, 178.1, 187.1, 179.1, 180.1, 248/181.1, 181.2, 185.1, 424, 429, 430; 396/419, 428
See application file for complete search history.

(56) References Cited

U.S. PATENT DOCUMENTS

| | | | | |
|---|---|---|---|---|
| 3,737,130 A | * | 6/1973 | Shiraishi ............. | F16M 11/048 248/181.1 |
| 4,952,953 A | * | 8/1990 | Ridderstolpe ......... | B66F 11/048 248/364 |
| 6,234,690 B1 | * | 5/2001 | Lemieux ................ | F16M 11/04 248/187.1 |
| 6,352,228 B1 | * | 3/2002 | Buerklin ............... | F16C 11/106 248/181.1 |
| 7,789,356 B1 | * | 9/2010 | Jones ..................... | F16M 11/16 248/178.1 |

(Continued)

FOREIGN PATENT DOCUMENTS

JP          2005-24442         1/2005

*Primary Examiner* — Terrell McKinnon
*Assistant Examiner* — Michael McDuffie
(74) *Attorney, Agent, or Firm* — Wenderoth, Lind & Ponack, L.L.P.

(57) ABSTRACT

An attachment portion of a tripod is formed with an opening that penetrates in a longitudinal direction of the tripod, the rail member of the shooting sliding device is provided with an adapter for attachment to the tripod, a first contact surface between the adapter and the rail member is a flat surface, a second contact surface between the adapter and the tripod has a curved surface, an attaching female screw is embedded at the center of the attachment side of the tripod in the second contact surface, the tightening handle has a grip, and a male screw projecting from one end of the grip, the adapter is placed on the attachment portion of the tripod, the male screw of the tightening handle is screwed into the female screw embedded in the adapter through the opening of the attachment portion of the tripod, the curved surface of the second contact surface of the adapter and the curved surface on the inner side of the attachment portion of the tripod come into surface-contact with each other and come into contact with each other under pressure, and the shooting sliding device is attached and fixed to the tripod.

6 Claims, 10 Drawing Sheets

(56) References Cited

U.S. PATENT DOCUMENTS

| | | | |
|---|---|---|---|
| 7,878,123 B2* | 2/2011 | Jackson | B61B 13/04 104/107 |
| 7,891,888 B2* | 2/2011 | Wood | F16M 11/42 396/419 |
| 8,021,060 B2* | 9/2011 | Sudhana | F16C 11/106 248/187.1 |
| 8,534,934 B1* | 9/2013 | Carney | F16M 11/02 248/178.1 |
| 8,721,199 B1* | 5/2014 | Hart | F16M 11/045 396/428 |
| 8,807,496 B2* | 8/2014 | Kessler | G03B 17/561 248/187.1 |
| 2007/0084979 A1* | 4/2007 | Hofner | F16M 11/02 248/177.1 |
| 2007/0090238 A1* | 4/2007 | Justis | A61B 17/7037 248/181.1 |
| 2009/0257741 A1* | 10/2009 | Greb | F16M 13/04 396/55 |
| 2009/0315288 A1* | 12/2009 | Hernandez | F16M 11/42 280/79.3 |
| 2014/0161434 A1* | 6/2014 | Koymen | G03B 17/561 396/428 |

* cited by examiner

TRIPOD APPARATUS

TECHNICAL FIELD

The present invention relates to a tripod apparatus having a shooting sliding device that allows a shooting device such as a video camera to linearly slide.

RELATED ART

As a shooting device used when shooting by allowing the video camera to slide in a horizontal direction, a shooting sliding device referred to as a camera slider or the like has been known. The shooting sliding device is generally described in JP 2005-24442 A. A stereoscopic image photographing device described in JP 2005-24442 A includes one ITV camera, a storage device, an elevation angle adjusting stage, an azimuth adjusting stage, a slider, a pedestal, a level, a power supply and the like. Among these components, the slider, the pedestal, and the level constitute the shooting sliding device. While shooting, the pedestal is horizontally fixed to a stand such as a tripod using the level, the video camera is fixed to the slider, and the slider is horizontally moved toward a shooting target, thereby shooting an image.

The shooting sliding device is able to shoot an image of the moving shooting target with the video camera while chasing in the moving direction by the slide of the slider on the pedestal, or is able to shoot an image with the video camera, while changing the shooting target, thereby allowing a variety of image expression. Furthermore, there is an advantage of obtaining a stable image having no blurring.

SUMMARY

Such a shooting sliding device requires that attachment to the tripod is more easily implemented, and attachment of the camera platform is more easily implemented.

The present invention has been made in view of the above-described circumstances, and an object thereof is to provide a tripod apparatus in which the attachment of the shooting sliding device to the tripod is easier, and the attachment of the camera platform is also easier.

In order to solve the above-described problems, according to the present invention, there is provided a tripod apparatus which includes a tripod in which an attachment portion recessed in a bowl shape is provided at a top portion; a shooting sliding device that includes an elongated rail member having a flat running surface, and a slider having a bearing rotatably supported so as to be able to run on the running surface of the rail member; and a tightening handle configured to attach and fix the shooting sliding device to the attachment portion of the tripod, wherein the attachment portion of the tripod is formed with an opening that penetrates in a longitudinal direction of the tripod, the rail member of the shooting sliding device is provided with an adapter for attachment to the tripod, a first contact surface between the adapter and the rail member is a flat surface, a second contact surface between the adapter and the tripod has a curved surface, an attaching female screw is embedded at the center of the attachment side of the tripod in the second contact surface, the tightening handle has a grip and a male screw projecting from one end of the grip, an adapter is placed on the attachment portion of the tripod, the male screw of the tightening handle is screwed into the female screw embedded into the adapter through the opening of the attachment portion of the tripod, a curved surface of the second contact surface of the adapter and a curved surface on the inner side of the attachment portion of the tripod come into surface-contact with each other and come into contact with each other under pressure, and the shooting sliding device is attached and fixed to the tripod.

According to the tripod apparatus of the present invention, the attachment of the shooting sliding device to the tripod is easier, and the attachment of the camera platform is also easier.

DETAILED DESCRIPTION

Figure 1:
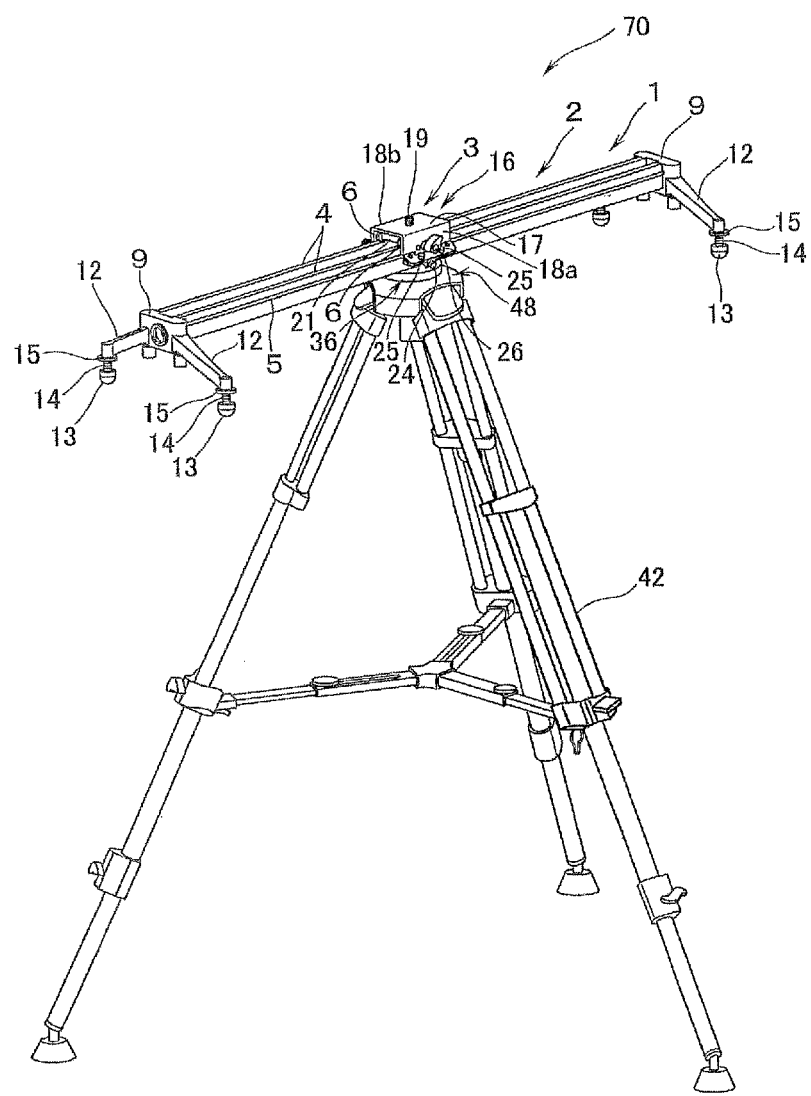
FIG. 1 is a perspective view illustrating a first embodiment of a tripod apparatus according to the present invention.
Figure 2:
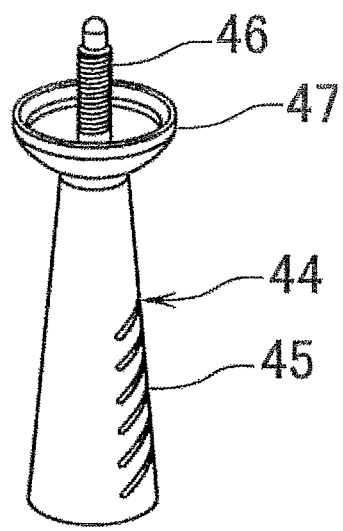
FIG. 2 is a perspective view illustrating a tightening handle provided in the tripod apparatus illustrated in FIG. 1.
Figure 3:
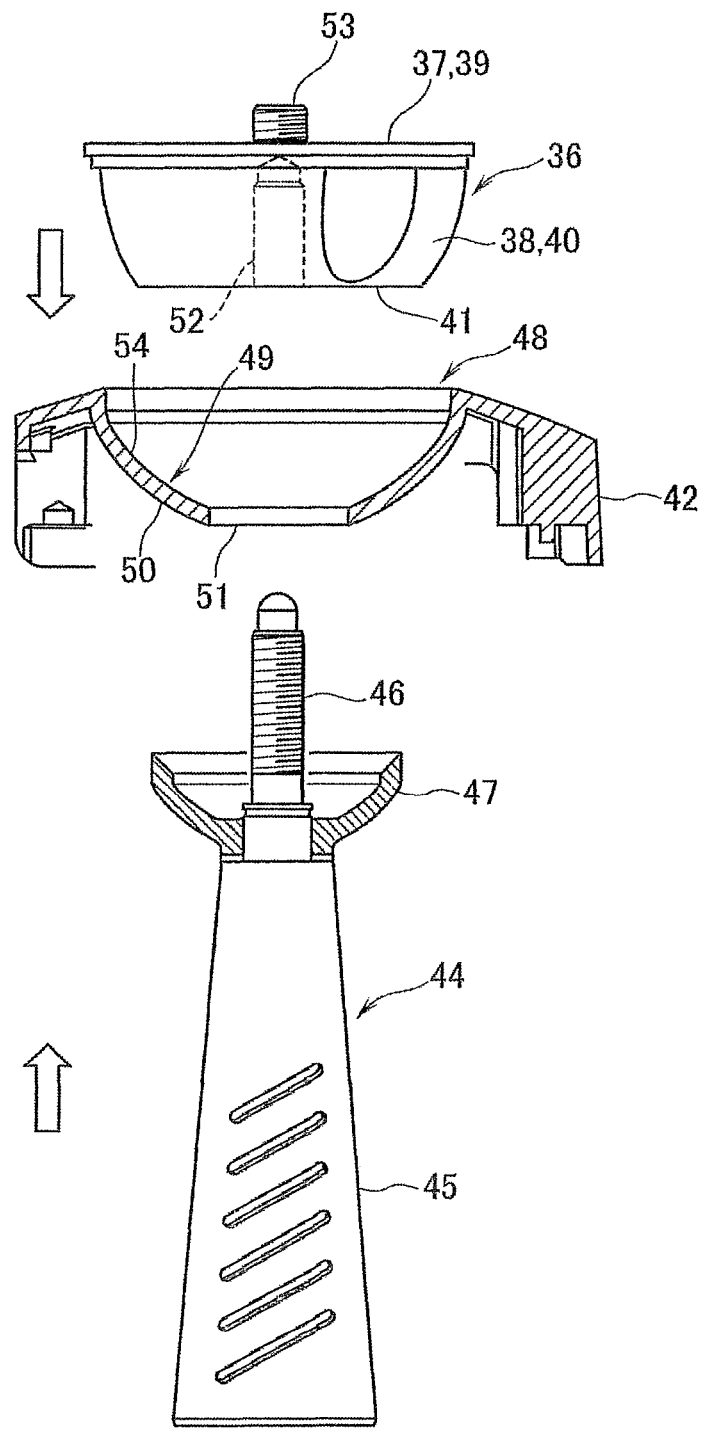
FIG. 3 is an exploded cross-sectional view of main parts illustrating a method of attaching the shooting sliding device to the tripod in the tripod apparatus illustrated in FIG. 1.

FIG. 1 is a perspective view illustrating a first exemplary embodiment of a tripod apparatus according to the present invention. FIG. 2 is a perspective view illustrating a tightening handle provided in the tripod apparatus illustrated in FIG. 1. FIG. 3 is an exploded cross-sectional view of main parts illustrating a method of attaching the shooting sliding device to the tripod in the tripod apparatus illustrated in FIG. 1.

A tripod apparatus 70 is provided with a tripod 42, a shooting sliding device 1, and a tightening handle 44. In the tripod 42, an attachment portion 49 recessed in a bowl shape is provided in a top portion 48. The shooting sliding device 1 is provided with an elongated rail member 2 having a first flat running surface 4 and a second flat running surface 5, a first bearing 6 that rotatably supports the first running surface 4 of the rail member 2 so as to be able to run in a freely rotatable manner, and a second bearing (reference numeral 22 in FIG. 6) that supports the second running surface 5 so as to be able to run in a freely rotatable manner. The tightening handle 44 is intended to attach and fix the shooting sliding device 1 to the attachment portion 49 of the tripod 42, and has a grip 45, and a male screw 46 projecting from one end of the grip 45.

Furthermore, in the attachment portion 49 of the tripod 42, an opening 51 penetrating in a longitudinal direction of the tripod 42 is formed. In the shooting sliding device 1, an adapter 36 for attachment to the tripod 42 is provided in the rail member 2. A first contact surface 37 between the adapter 36 and the rail member 2 is a flat surface 39, and a second contact surface 38 between the adapter 36 and the tripod 42 has a curved surface 40. Furthermore, an attaching female screw 52 is embedded at the center of the attachment side of the tripod 42 of the second contact surface 38.

In the tripod apparatus 70, the adapter 36 is place on the attachment portion 49 of the tripod 42, and a male screw 46 of the tightening handle 44 is engaged with a female screw 52 embedded in the adapter 36 through the opening 51 of the attachment portion 49 of the tripod 42. At this time, the curved surface 40 of the second contact surface 38 of the adapter 36 and the curved surface 54 on the inner side of the attachment portion 49 of the tripod 42 come into surface-contact with each other, and come into contact with each other under pressure. In this way, the shooting sliding device 1 is attached and fixed to the tripod 42, and thus the tripod apparatus 70 is formed.

Specifically, in the tightening handle 44, the male screw 46 projects from one end of the grip 45, and on an outer periphery of a portion in which the male screw 46 projects from the grip 45, a saucer-shaped curved support portion 47 capable of coming into contact with the curved surface 50 on the outer side of the attachment portion 49 recessed in a bowl shape provided at the top portion 48 of the tripod 42 is provided. The attachment portion 49 of the top portion 48 of the tripod 42 is formed with an opening 51 penetrating in the longitudinal direction of the tripod 42. When forming the tripod apparatus 70, the curved surface 40 of the second contact surface 38 of the adapter 36 is placed on the curved surface 54 on the inner side of the attachment portion 49 of the top portion 48 of the tripod 42. Next, the male screw 46 of the tightening handle 44 is screwed into the female screw 52 embedded in the adapter 36 from the outer side of the curved surface 50 of the attachment portion 49 of the top portion 48 of the tripod 42 through the opening 51 formed in the attachment portion 49 and is tightened. Along with tightening of the tightening handle 44, the curved surface 40 of the second contact surface 38 of the adapter 36 and the curved surface 50 on the outer side of the attachment portion 49 of the top portion 48 of the tripod 42 come into surface-contact with each other and come into contact with each other under pressure. The adapter 36 is fixed to the attachment portion 49 of the top portion 48 of the tripod 42 by this pressure contact, the shooting sliding device 1 is fixed to the tripod 42, and thus, the tripod apparatus 70 is formed. In this way, since the shooting sliding device 1 is easily attached to the tripod 42, the tripod apparatus 70 is easily formed. Furthermore, since the support portion 47 of the tightening handle 44 comes into contact with the curved surface 50 of the attachment portion 49 provided at the top portion 48 of the tripod 42, the fixed state between the shooting sliding device 1 and the tripod 42 is stably maintained.

Figure 4:
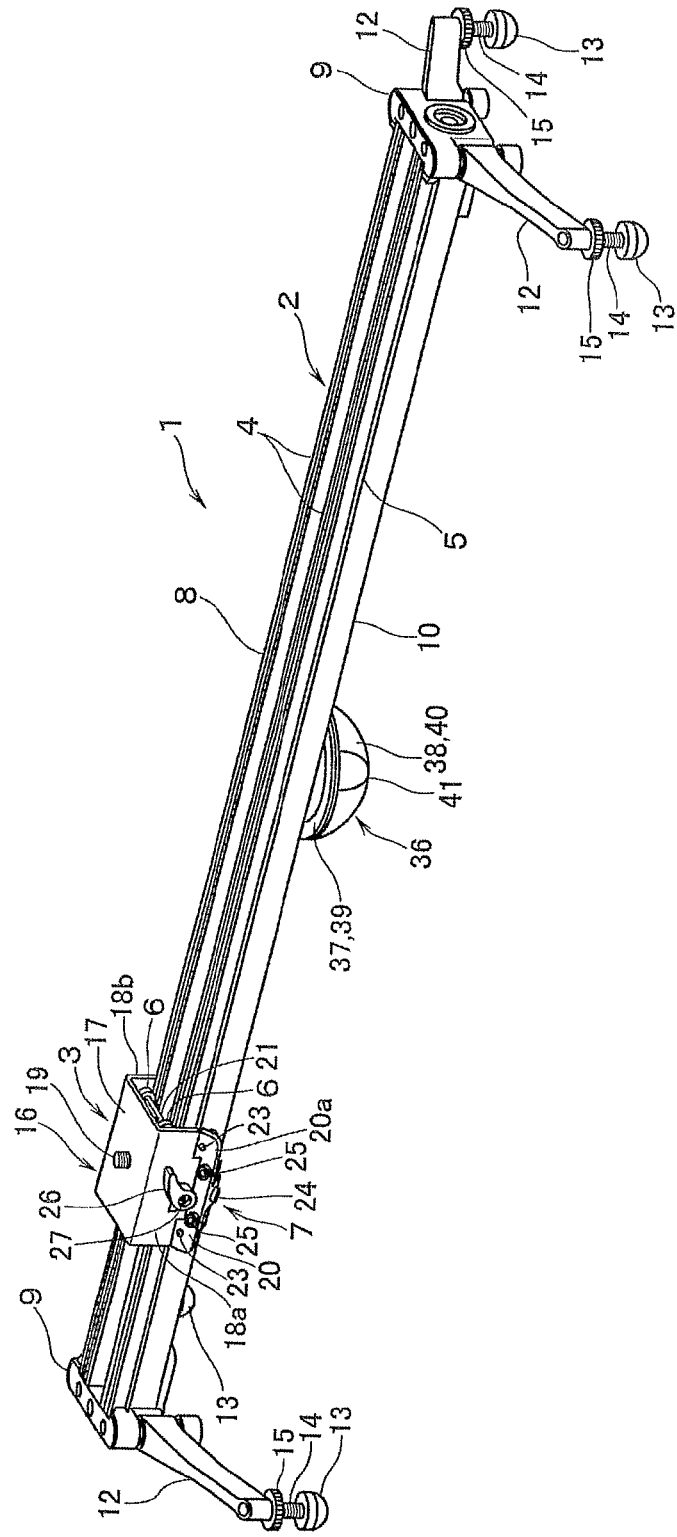
FIG. 4 is a perspective view illustrating an exemplary embodiment of the shooting sliding device provided in the tripod apparatus of the present invention.

FIG. 4 is a perspective view illustrating an exemplary embodiment of the shooting sliding device provided in the tripod apparatus of the present invention.

In the shooting sliding device 1, the rail member 2 is provided with a main body 8 having a first running surface 4 and a second running surface 5, and a base 9 attached to both end portions in the longitudinal direction of the main body 8.

Figure 5:
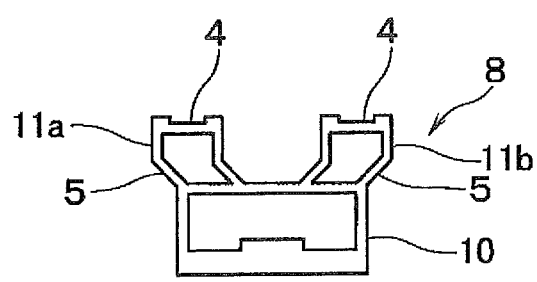
FIG. 5 is a cross-sectional view of main parts illustrating a main body in a rail member of the shooting sliding device illustrated in FIG. 4.

FIG. 5 is a cross-sectional view of main parts illustrating the main body of the rail member of the shooting sliding device illustrated in FIG. 4.

The main body 8 is formed from a hollow building frame portion 10 having a rectangular cross-section, and rail portions 11a and 11b that obliquely stand to the outside of the building frame portion 10 from each of both end portions in a width direction of the building frame portion 10 and extend straightly from the stood leading end. The rail portions 11a and 11b are also hollow similarly to the building frame portion 10, and are symmetrically disposed with respect to the center in the width direction of the building frame portion 10. The first running surface 4 is formed to be recessed in a concave shape at the leading end portions of the rail portions 11a and 11b. The first running surface 4 formed on the rail portions 11a and 11b is disposed on the same plane. The second running surface 5 is an outer surface of the portion that obliquely stands from the building frame portion 10 in the rail portions 11a and 11b. The second running surface 5 is disposed so as to be tilted with respect to the first running surface 4, and a tilt angle thereof is 45°. As long as the running properties of the slider 3 illustrated in FIG. 4 along the rail member 2 are stable, the tilt angle of the second running surface 5 with respect to the first running surface 4 is not limited to 45°, and may be an acute angle that is greater than 0° and less than 90°.

As illustrated in FIG. 4, the base 9 has two legs 12 extending so as to be tilted downward toward the outer side in the width direction of the main body 8. An opening degree of the two legs 12 is adjustable. At the leading end portion of the leg 12, an adjuster 13 configured to adjust the horizontal installation of the shooting sliding device 1 is provided, the adjuster 13 has a bolt portion 14, and the bolt portion 14 can go in and out at the leading end portion of the leg 12. A lock nut 15 is provided at the leading end portion of the leg 12, the bolt portion 14 of the adjuster 13 is freely rotatable with respect to the lock nut 15, and the projection length from the leading end portion of the leg 12 can change by the rotation of the adjuster 13. The lock nut 15 is not allowed the rotation of the adjuster 13 by being tightened. When loosening the lock nut 15, the rotation of the adjuster 13 becomes possible.

The slider 3 is provided with the main body 16. The main body 16 is formed from a flat attachment surface portion 17 configured to attach the video camera or the camera platform, and a pair of support surface portions 18a and 18b extending from both end edges in the width direction of the attachment surface portion 17. The support surface portions 18a and 18b are disposed to face each other. At the center of the attachment surface portion 17, a male screw 19 to be engaged with the attaching female screw formed on the bottom surface portion of the video camera or the camera platform projects. In the leading end portions of the support surface portions 18a and 18b, on the opposite side to the support surface portions 18a and 18b facing to each other, i.e., skirt portions 20a and 20b extending obliquely outward in the width direction of the main body 16 are provided. The initial setting mechanism 7 is incorporated into the skirt portion 20a of the support surface portion 18a.

Figure 6:
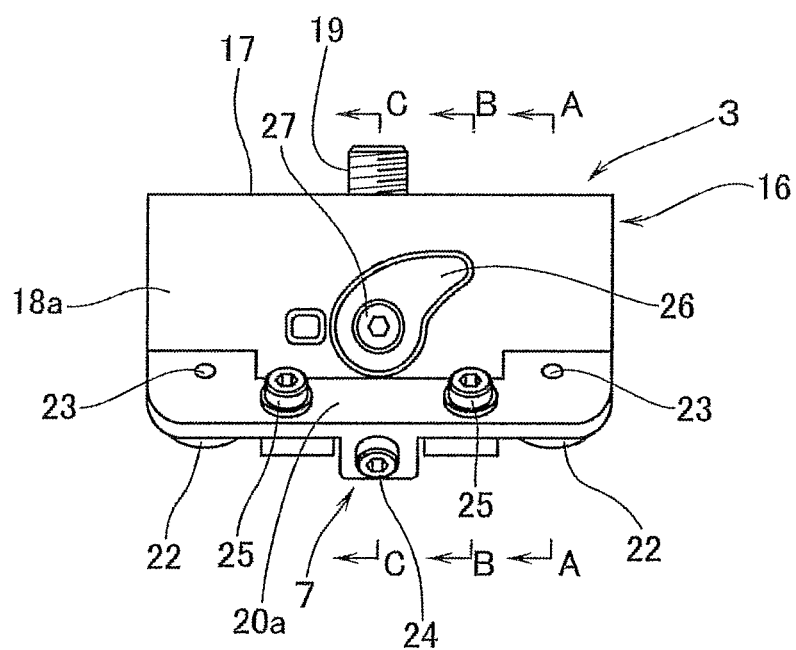
FIG. 6 is a side view illustrating a slider of the shooting sliding device illustrated in FIG. 4.
Figure 7A:
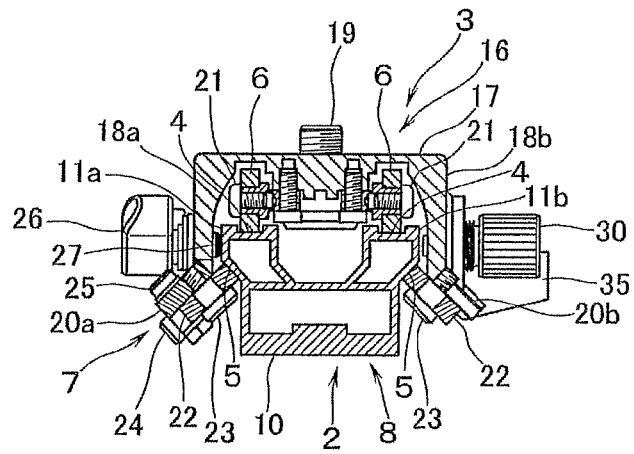
FIGS. 7A, 7B, and 7C are a cross-sectional view taken along a line A-A of the slider illustrated in FIG. 3, a cross-sectional view taken along a line B-B thereof, and a cross-sectional view taken along a line C-C thereof, respectively.
Figure 7B:
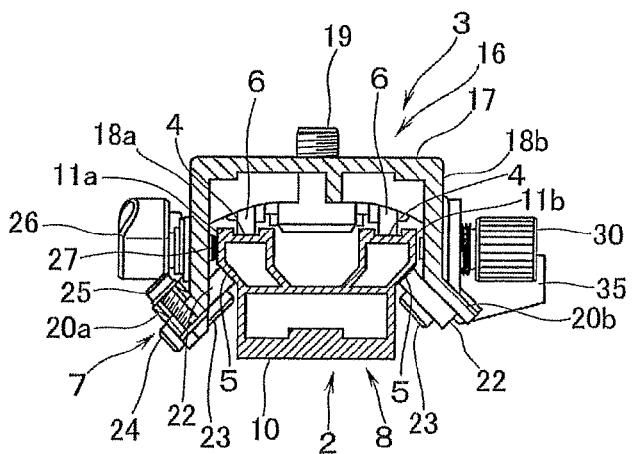
Figure 7C:
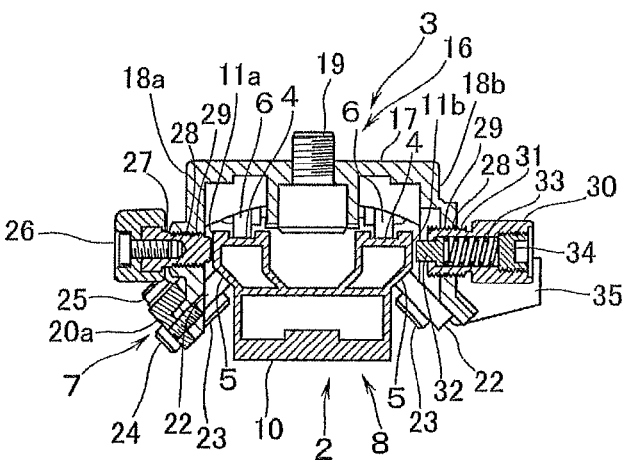

FIG. 6 is a side view illustrating a slider of the shooting sliding device illustrated in FIG. 4. FIGS. 7A, 7B, and 7C are a cross-sectional view taken along a line A-A of the slider illustrated in FIG. 3, a cross-sectional view taken along a line B-B thereof, and a cross-sectional view taken along a line C-C thereof, respectively.

The first bearing 6 extends from the attachment surface portion 17 between the support surface portions 18a and 18b, is rotatably attached to the ribs disposed in parallel to the support surface portions 18a and 18b by the shaft 21, and is supported between the support surface portions 18a and 18b. The two first bearings 6 are disposed at both ends in the longitudinal direction of the main body 16. Accordingly, the slider 3 is provided with total four first bearings 6. The first bearing 6 is placed on the first running surface 4 of the rail member 2 and can run on the first running surface 4.

The second bearing 22 is rotatably attached to the skirt portions 20a and 20b of the support surface portions 18a and 18b by the shaft 23, and the second bearing 22 is disposed inside the main body 16. As in the first bearing 6, two second bearings 22 are disposed at both end portions in the longitudinal direction of the main body 16, and the slider 3 is provided with total four second bearings 22.

The initial setting mechanism 7 is incorporated in the skirt portion 20a of the slider 3. The initial setting mechanism 7 is provided with an adjusting bolt 24 and a fixing bolt 25. The adjusting bolt 24 can bring the second bearing 22 into contact with the second running surface 5 by screwing to increase the contact pressure thereof. Meanwhile, when loosening the adjusting bolt 24, it is possible to reduce the contact pressure of the second bearing 22 to the second running surface 5. The contact pressure of the second bearing 22 to the second running surface 5 due to the adjusting bolt 24 is adjusted to the extent that the second bearing 22 can smoothly run on the second running surface 5. The fixing bolt 25 is screwed after adjusting the contact pressure of the second bearing 22 to the second running surface 5 due to the adjusting bolt 24. The state adjusted to the contact pressure suitable for running is maintained by the fixing bolt 25. The adjusting bolt 24 is disposed in parallel with the width direction of the skirt portion 20a, and is disposed at the center in the longitudinal direction of the skirt portion 20a. The fixing bolts 25 are arranged at a predetermined interval in the longitudinal direction of the skirt portion 20a around the adjusting bolt 24. Therefore, total two fixing bolts 25 are provided in the initial setting mechanism 7.

Figure 8:
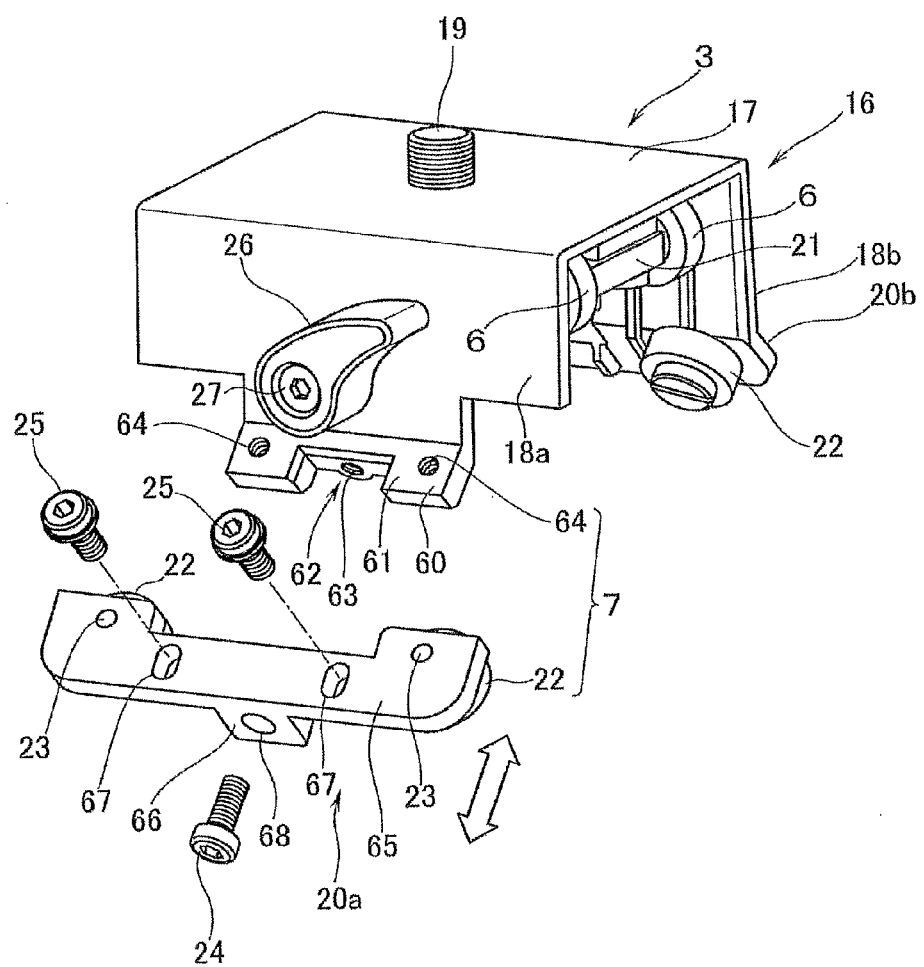
FIG. 8 is an exploded perspective view illustrating the slider illustrated in FIG. 6 from one support surface portion side.
Figure 9:
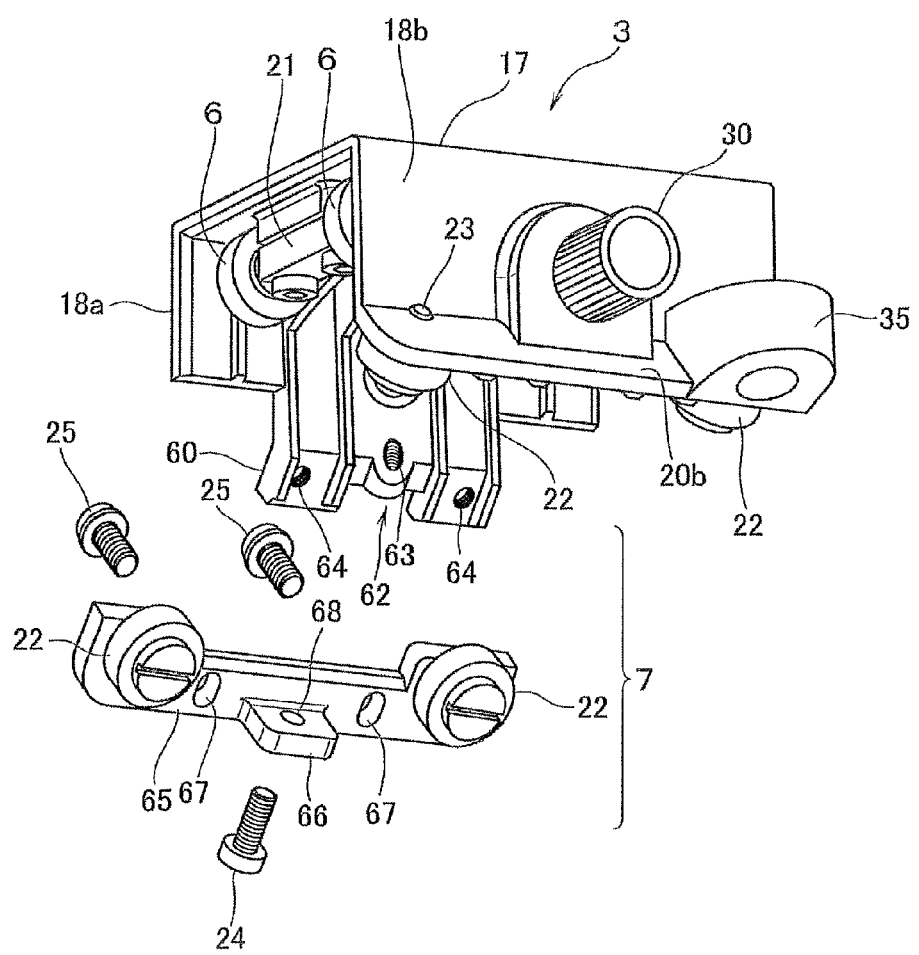
FIG. 9 is an exploded perspective view illustrating the slider illustrated in FIG. 6 from the other support surface portion side.

FIG. 8 is an exploded perspective view illustrating the slider illustrated in FIG. 6 from one support surface portion side. FIG. 9 is an exploded perspective view illustrating the slider illustrated in FIG. 6 from the other support surface portion side.

As described above, the initial setting mechanism 7 is incorporated in the skirt portion 20a of the slider 3. In the central portion in the longitudinal direction of the support surface portion 18a, the skirt portion 20a extends to the opposite side to the attachment surface portion 17, and has a fixing portion 60 which is bent so as to be disposed obliquely to the attachment surface portion 17. The front of the fixing portion 60 has a flat surface 61. In the fixing portion 60, a notch portion 62 is formed at the center in the longitudinal direction, and a contact pressure adjusting portion 63 having a female screw shape is provided in the notch portion 62. The contact pressure adjusting portion 63 is intended to adjust the contact pressure of the second bearing 22 due to the adjusting bolt 24. Furthermore, in the fixing portion 60, a screw portion 64 having a female screw shape is provided on both sides in the longitudinal direction of the fixing portion 60 with the notch portion 62 interposed therebetween.

Furthermore, the skirt portion 20a has a main body 65 to which the second bearing 22 is attached, and a projecting portion 66 which protrudes to the side on which the second bearing 22 is attached in the central portion of the main body 65. In the main body 65, the width of both ends of the longitudinal direction is enlarged, and the second bearing 22 is rotatably attached to each of both end portions by the shaft 23. Furthermore, in the main body 65, on the inner side of the portion to which the second bearing 22 is attached, elongated holes 67 are formed in the width direction of the main body 65, and the two elongated holes 67 can overlap the screw portion 64 of the fixing portion 60. The width of the projecting portion 66, that is, the longitudinal length of the main body 65 is within the length of the notch portion 62 of the fixing portion 60, and in the projecting portion 66, a bolt insertion holes 68 capable of overlapping the contact pressure adjusting portion 63 of the fixing portion 60 are formed through the front and the back of the projecting portion 66.

The back as the flat surface of skirt portion 20a is arranged to overlap the front of the main body 65 so that the two second bearings 22 are disposed on the outside in the longitudinal direction of the fixing portion 60, respectively. At this time, the two elongated holes 67 of the main body 65 each overlap the two screw portions 64 of the fixing portion 60, the projecting portion 66 is disposed inside the notch portion 62 of the fixing portion 60, and the bolt insertion hole 68 overlaps the contact pressure adjusting portion 63. In this state, the adjusting bolt 24 is inserted into the bolt insertion hole 68 from the outside of the front of the projecting portion 66 and is screwed into the contact pressure adjusting portion 63. By changing the screwing degree of the adjusting bolt 24, that is, by tightening or loosening the bolt, the main body 65 of the skirt portion 20a moves in the direction of an arrow illustrated in FIG. 5 with respect to the fixing portion 60. As a result, the arrangement position of the skirt portion 20a to the fixing portion 60 is changed, the second bearing 22 moves forward and backward with respect to the second running surface 5, and as illustrated in FIG. 7C, it is possible to adjust the contact pressure of the second bearing 22 to the second running surface 5. After adjustment of the contact pressure, as illustrated in FIGS. 7A and 7B, the two fixing bolts 25 are each inserted into the inside of the two elongated holes 67 from the outside of the front of the main body 65 of the skirt portion 20a and are screwed into the screw portions 64. The main body 65 of the skirt portion 20a is fixed to the fixing portion 60 by screwing of the fixing bolts 25 to the screw portions 64, and the state adjusted to the contact pressure suitable for running of the second bearing 22 is maintained. The second bearing 22 is capable of running on the second running surface 5 by the adjusted contact pressure.

Furthermore, in the slider 3, at the center in the longitudinal direction of the support surface portion 18a, a brake knob 26 is provided in a freely rotationally movable manner. As illustrated in FIG. 7C, the brake knob 26 has a brake shaft 27, and the male screw 28 is cut on the front portion of the brake shaft 27. In the support surface portion 18a, the female screw 29 which allows the brake shaft 27 to move forward and backward is formed through the front and back, and the male screw 28 of the brake shaft 27 is screwed into the female screw 29. The leading end portion of the brake shaft 27 comes into contact with and is pressed against the outer surface in the longitudinal direction of the rail portion 11a of the rail member 2 by rotationally moving the brake knob 26, and thus, the slider 3 is not able to slide along the rail member 2. Meanwhile, when rotationally moving the brake knob 26 in the reverse direction to release the pressing force caused by the brake shaft 27, the slider 3 is able to slide.

As illustrated in FIG. 7C, at the center in the longitudinal direction of the support surface portion 18b disposed to face the support surface portion 18a, a friction knob 30 is rotatably provided. The friction knob 30 has a first friction shaft 31, and the male screw 28 is cut on the front portion of the first friction shaft 31. In the support surface portion 18b, the female screw 29 that allows the first friction shaft 31 to move forward and backward is formed through the front and back, and the male screw 28 of the first friction shaft 31 is screwed into the female screw 29. Furthermore, at the leading end portion of the first friction shaft 31, a second friction shaft 32 capable of moving forward and backward in the longitudinal direction of the first friction shaft 31 is provided. The second friction shaft 32 is housed in a hollow portion 33 formed inside the first friction shaft 31 except for the leading end portion. The hollow portion 33 is formed from the leading end portion of the second friction shaft 32 to the friction knob 30. A coil spring 34 is built in the hollow portion 33, and the coil spring 34 freely expands and contracts between the friction knob 30 and the second friction shaft 32.

When rotating the friction knob 30 to screw the first friction shaft 31 toward the rail portion 11b of the rail member 2, the leading end portion of the second friction shaft 32 comes into contact with the outer surface in the longitudinal direction of the rail portion 11b. At this time, the coil spring 34 built in the hollow portion 33 contracts, and the elastic force is generated. The generated elastic force presses the outer surface of the rail portion 11b via the leading end portion of the second friction shaft 32, and thus, friction is generated. The magnitude of the friction can be adjusted by screwing condition of the first friction shaft 31 caused by the rotation of the friction knob 30. For example, when increasing the sliding speed of the slider 3, the friction can become smaller, and when decreasing the sliding speed, the friction can become larger. Furthermore, the occurrence of friction efficiently functions in adjusting the contact pressure of the second bearing 22 to the second running surface 5 due to the adjusting bolt 24 provided in the initial setting mechanism 7, and facilitates the adjustment of the contact pressure.

Furthermore, the support surface portion 18b is provided with a level 35 adjacent to the friction knob 30. The level 35 protrudes toward the outer side of the support surface portion 18b.

As illustrated in FIG. 1, the shooting sliding device 1 as described above can not only be attached to the tripod 42, but can be independently installed on the table. When installing the shooting sliding device 1 on the table, in the rail member 2, two legs of the base 9 provided at both end portions in the longitudinal direction thereof are opened at an appropriate degree of opening legs, and the adjuster 13 located at the leading end portion of the leg 12 is disposed so as to abut against the front of the table. At this time, in the slider 3, the first bearing 6 is mounted on the first running surface 4, in the state that causes the friction to some extent by the rotation of the friction knob 30, the brake knob 26 is rotationally moved, and the slider 3 is kept in a non-slidable state. Next, the adjuster 13 is rotated so that the rail member 2 is horizontally arranged using the level 35, and the rail member 2 is fixed by the lock nut 15 after adjust the length thereof, thereby completing the installation of the rail member 2.

Thereafter, the brake knob 26 is rotationally moved in the reverse direction, the slider 3 is made free, and thereafter, the second bearing 22 is moved toward and brought into contact with the second running surface 5 by the adjusting bolt 24 provided in the initial setting mechanism 7, thereby adjusting the contact pressure. After checking the sliding condition of the slider 3 along the rail member 2, the fixing bolt 25 provided in the initial setting mechanism 7 is screwed to maintain the adjusted contact pressure. Adjustment and maintenance of the contact pressure between the second bearing 22 and the second running surface 5 as described above may be carried out either before or after attaching the video camera or the camera platform to the attachment surface portion 17.

As described above, the shooting sliding device 1 is provided with the rail member 2 that has the first running surface 4 and the second running surface 5 disposed so as to be tilted with respect to the first running surface 4, and the slider 3 that has the first bearing 6 capable of running on the first running surface 4 and the second bearing 22 capable of running on the second running surface 5. For this reason, the linear slide of the slider 3 along the rail member 2 becomes more stable. Stability of the linear slide becomes obvious by the first bearings 6 and the second bearings 22, and the total four first and second bearings are each provided. Furthermore, in the shooting sliding device 1, since the slider 3 has the initial setting mechanism 7 that moves the second bearing 22 forward and backward with respect to the second running surface 5 to adjust the contact pressure of the second bearing 22 to the second running surface 5, the adjustment of the slide of the slider becomes easier.

Furthermore, as illustrated in FIG. 4, in the shooting sliding device 1, at the center of the building frame portion 10 of the rail member 2, the adapter 36 for attachment to the tripod 42 is provided. As described above, the adapter 36 has a first contact surface 37 capable of coming into contact with the building frame portion 10 of the rail member 2, and a second contact surface 38 capable of coming into contact with the attachment portion 49 provided in the top portion 48 of the tripod 42. The first contact surface 37 is a flat surface 39, and the second contact surface 38 has a curved surface 40. Furthermore, the second contact surface 38 has a flat surface 41 in a portion that is disposed to face the first contact surface 37. An attaching female screw 52 is embedded at the center of the attachment side of the tripod in the second contact surface 38. As illustrated in FIG. 4, the adapter 36 is a relatively thin member, the thickness thereof is suppressed within the height of the leg 12, and the adapter has no member protruding from the second contact surface 38, which does not impede the installation of the shooting sliding device 1 onto the table at all.

In addition, for attachment of the adapter 36, in the shooting sliding device 1, female screws (not illustrated) are cut at total three locations at the center of the building frame portion 10 of the rail member 2 and at both ends in the longitudinal direction. Furthermore, the male screw 53 standing from the first contact surface 37 is provided at the center of the first contact surface 37 of the adapter 36. By screwing between the male screw 53 and the female screw, the attachment of the adapter 36 to the rail member 2 becomes freely attachable and detachable, and it is possible to change the attachment position of the adapter 36 to the rail member 2 by selecting the female screws formed in the building frame portion 10.

Figure 10:
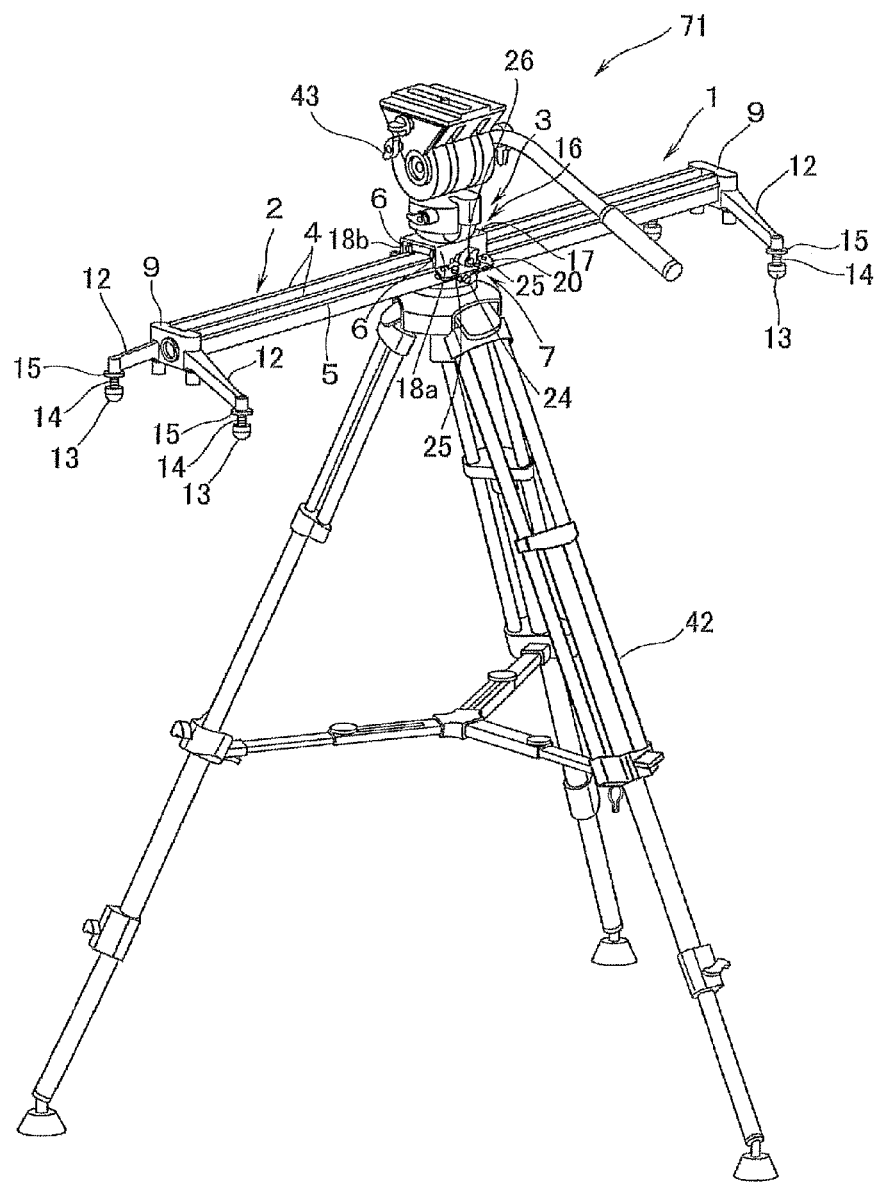
FIG. 10 is a perspective view illustrating a second exemplary embodiment of a tripod apparatus of the present invention.

FIG. 10 is a perspective view illustrating a second exemplary embodiment of the tripod apparatus of the present invention.

In a tripod apparatus 71, the camera platform 43 is attached to the shooting sliding device 1 of the tripod apparatus 70 illustrated in FIG. 1. On the bottom surface portion of the camera platform 43, a female screw (not illustrated) to be screwed to the male screw 19 provided in the attachment surface portion 17 of the main body 16 of the slider 3 is provided, and the camera platform 43 is attached and fixed to the slider 3, by screwing the male screw 19 into the female screw. In the tripod apparatus 71, the attachment of the camera platform 43 has also become easier. Furthermore, since the tripod apparatus 71 is combined with the camera platform 43, tilting and panning as well as the slide of the video camera also becomes possible, and a variety of shooting corresponding to the movement of the shooting target and the image as planned becomes possible.

In addition, the tightening handle 44 illustrated in FIG. 2 can be shared with one used when directly attaching the camera platform 43 to the tripod 42 without attaching the shooting sliding device 1.

Moreover, in the tripod apparatuses 70 and 71, since the second contact surface 38 of the adapter 36 provided in the shooting sliding device 1 has the curved surface 40, the shooting sliding device 1 can not only be horizontally disposed, but can be disposed so as to be tilted in a desired direction.

The tripod apparatus of the present invention is not limited to the above-described embodiments. Various modifications can be made to the shape and the structure of the tripod, the shooting sliding device, and the tightening handle.

What is claimed is:

1. A tripod apparatus comprising:
    a tripod in which an attachment portion recessed in a bowl shape is provided at a top portion;
    a shooting sliding device that includes an elongated rail member having a flat running surface, and a slider having a bearing rotatably supported so as to be able to run on the running surface of the rail member; and
    a tightening handle configured to attach and fix the shooting sliding device to the attachment portion of the tripod,
    wherein the attachment portion of the tripod is formed with an opening that penetrates in a longitudinal direction of the tripod,
    the rail member of the shooting sliding device is provided with an adapter for attachment to the tripod, a first contact surface between the adapter and the rail member is a flat surface, a second contact surface between the adapter and the tripod has a curved surface, and an attaching female screw is embedded at the center of the attachment side of the tripod in the second contact surface,
    the tightening handle has a grip and a male screw projecting from one end of the grip, and
    the adapter is placed on the attachment portion of the tripod, the male screw of the tightening handle is screwed into the female screw embedded in the adapter through the opening of the attachment portion of the tripod, the curved surface of the second contact surface of the adapter and the curved surface on the inner side of the attachment portion of the tripod come into surface-contact with each other and come into contact with each other under pressure, and the shooting sliding device is attached and fixed to the tripod.

2. The tripod apparatus according to claim 1, wherein the tightening handle has a saucer-shaped curved support portion capable of coming into contact the curved surface on the outer side of the attachment portion of the tripod, on an outer periphery of a portion in which the male screw projects from the grip, and when attaching the tripod and the shooting sliding device by the tightening handle, the support portion of the tightening handle comes into contact with the curved surface on the outer side of the attachment portion of the tripod.

3. The tripod apparatus according to claim 1, wherein the slider of the shooting sliding device has an male screw, a female screw screwed to the male screw of the slider is provided on a bottom portion of a camera platform, the male screw is screwed into the female screw, and the camera platform is attached and fixed to the slider.

4. The tripod apparatus according to claim 1, wherein the running surface of the rail member has a first running surface, and a second running surface disposed so as to be tilted to the first running surface, and the slider has a first bearing rotatably supported so as to be able to run on the first running surface of the rail member, a second bearing rotatably supported so as to be able to run on the second running surface of the rail member, and an initial setting mechanism that moves the second bearing forward and backward with respect to the second running surface to adjust the contact pressure of the second bearing to the second running surface.

5. The tripod apparatus according to claim 4, wherein the slider has a pair of support surface portions that is arranged to face each other and rotatably supports the first bearing disposed therebetween, and a skirt portion which extends obliquely to the opposite side to the facing support surface portion from the support surface portion and to which the second bearing is rotatably attached,
    the initial setting mechanism is provided with an adjusting bolt, a fixing bolt, a fixing portion that has a front on which a back of the skirt portion can be disposed and has a screw portion capable of being screwed by the fixing bolt, and a contact pressure adjusting portion of the second bearing which is provided in the fixing portion and to which the adjusting bolt can be screwed, and the initial setting mechanism is incorporated in one skirt portion, and
    by screwing of the adjusting bolt into the contact pressure adjusting portion, an arrangement position of the skirt portion to the fixing portion is changed, the second bearing moves forward and backward with respect to the second running surface, the contact pressure of the second bearing to the second running surface is changed, and by screwing of the fixing bolt into the screw portion, the skirt portion is fixed to the fixing portion, and the second bearing is capable of running on the second running surface by the adjusted contact pressure.

6. The tripod apparatus according to claim 2, wherein the slider of the shooting sliding device has an male screw, a female screw screwed to the male screw of the slider is provided on a bottom portion of a camera platform, the male screw is screwed into the female screw, and the camera platform is attached and fixed to the slider.

* * * * *